United States Patent
Makowski et al.

(10) Patent No.: US 10,805,336 B2
(45) Date of Patent: *Oct. 13, 2020

(54) SYSTEM AND METHOD FOR IDENTIFYING AND PREVENTING VULNERABILITY EXPLOITATION USING SYMBOLIC CONSTRAINTS

(71) Applicant: Narf Industries, LLC, San Francisco, CA (US)

(72) Inventors: Paul Makowski, San Diego, CA (US); Benjamin Schmidt, San Diego, CA (US)

(73) Assignee: Narf Industries, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,099

(22) Filed: Dec. 5, 2018

(65) Prior Publication Data

US 2019/0116201 A1 Apr. 18, 2019

Related U.S. Application Data

(63) Continuation of application No. 15/209,730, filed on Jul. 13, 2016, now Pat. No. 10,187,418.

(60) Provisional application No. 62/192,039, filed on Jul. 13, 2015.

(51) Int. Cl.
| | | |
|---|---|---|
| G06F 21/00 | (2013.01) | |
| H04L 29/04 | (2006.01) | |
| H04L 29/06 | (2006.01) | |
| G06F 11/36 | (2006.01) | |
| G06F 21/54 | (2013.01) | |

(52) U.S. Cl.
CPC ...... H04L 63/1433 (2013.01); G06F 11/3668 (2013.01); G06F 21/54 (2013.01); H04L 63/02 (2013.01); H04L 63/0227 (2013.01); H04L 63/0263 (2013.01)

(58) Field of Classification Search
CPC ... H04L 63/1433; H04L 63/02; G06F 11/3668
See application file for complete search history.

(56) References Cited

U.S. PATENT DOCUMENTS

| | | | | |
|---|---|---|---|---|
| 8,468,516 | B1 * | 6/2013 | Chen | G06F 8/656 717/170 |
| 2006/0277539 | A1 * | 12/2006 | Amarasinghe | G06F 21/53 717/168 |
| 2008/0320456 | A1 * | 12/2008 | Biswas | G06F 8/65 717/145 |
| 2011/0314454 | A1 * | 12/2011 | Godefroid | G06F 11/3676 717/131 |

(Continued)

Primary Examiner — Lisa C Lewis
(74) Attorney, Agent, or Firm — Kwan & Olynick LLP (57) ABSTRACT

A system and method for identifying and preventing vulnerability exploitation is provided. The system comprises a processor and memory. The memory stores one or more programs comprising instructions to execute a method. The method first comprises comparing a first version of a software module with a second version of a software module. Second, the system determines one or more differences between the first version and the second version. Next, the system represents the one or more differences as symbolic constraints. Last, the system generates a firewall for identifying exploitative input using the symbolic constraints.

20 Claims, 8 Drawing Sheets (56) References Cited

U.S. PATENT DOCUMENTS

2012/0084759 A1\* 4/2012 Candea .............. G06F 11/3612
717/126

\* cited by examiner

SYSTEM AND METHOD FOR IDENTIFYING AND PREVENTING VULNERABILITY EXPLOITATION USING SYMBOLIC CONSTRAINTS

CROSS-REFERENCE TO RELATED APPLICATIONS

This application is a continuation of U.S. application Ser. No. 15/209,730, entitled "SYSTEM AND METHOD FOR IDENTIFYING AND PREVENTING VULNERABILITY EXPLOTATION USING SYMBOLIC CONSTRAINTS", filed on Jul. 13, 2016, the entire disclosure is incorporated herein by reference for all purposes. This application claims priority to U.S. Application No. 62/192,039, entitled "SYSTEM AND METHOD FOR IDENTIFYING AND PREVENTING VULNERABILITY EXPLOITATION USING SYMBOLIC CONSTRAINTS", filed on Jul. 13, 2015, the entire disclosure is incorporated herein by reference for all purposes.

TECHNICAL FIELD

The disclosed embodiments relate generally to computer network systems.

BACKGROUND

The Internet is a global system of interconnected computer networks that use the standard Internet protocol suite (TCP/IP) to link several billion devices worldwide. Because of the interconnectivity, billions of devices may freely share information with one another. The sharing of information has led to a revolution in the economy based on information computerization, known as the "information age." While this "information age" provides many benefits, there are also many disadvantages to being connected to other devices. For example, malicious users of the Internet may use viruses and worms to gain access or disable another user's computer. They do so by taking advantage of vulnerabilities in the software used to connect to the Internet.

One solution for addressing vulnerabilities is to issue new, updated versions of the software, referred to as "patches." However, installing patches can be very expensive and costly. In addition, the installation process takes time and can disrupt business. For example, many patch installations require a system reboot or server shutdown, which is not an option for some businesses.

Other solutions, such as traditional anti-viral software or firewalls, are only partially effective because the solutions focus on signatures and attack patterns of already known malicious software. Thus, new malicious software, with new signatures, would not be detected by traditional anti-viral software or firewalls (a.k.a. "false negatives"). In addition, some current solutions are over protective and falsely identify non-malicious users as malicious attackers (a.k.a. "false positives"). Thus, current solutions are neither "sound," meaning no false positives, nor "complete," meaning no false negatives. Therefore, there exists a need to protect vulnerabilities in software from exploitation without using a patch that is both sound and complete (a.k.a. "precise").

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are configured machine systems, methods, and computer readable media for identifying exploitative input. In one aspect of the present disclosure, which may include at least a portion of the subject matter of any of the preceding and/or following examples and aspects, a system comprises a processor and memory. The memory stores one or more programs comprising instructions to execute a method in accordance with yet another aspect of the present disclosure. The method first comprises comparing a first version of a software module with a second version of a software module. Second, the system determines one or more differences between the first version and the second version. Next, the system represents the one or more differences as symbolic constraints. Last, the system generates a firewall for identifying exploitative input using the symbolic constraints.

In another aspect of the present disclosure, a non-transitory computer readable medium is provided comprising one or more programs configured for execution by a computer system. In some embodiments, the one or more programs include instructions for performing the actions of described methods and systems. These other implementations may each optionally include one or more of the following features.

In some embodiments, the second version of the software module is a security patch of the first version of the software module. In some embodiments, the second version of the software module is configured to identify particular exploitative input that the first version of the software module cannot and identifying exploitative input includes identifying the same particular exploitative input without installing the second version of the software module. In some embodiments, identifying the exploitative input occurs with a false positive rate of zero and a false negative rate of zero for known and patched vulnerabilities. In some embodiments, identifying exploitative input includes setting one or more breakpoints at one or more vulnerabilities in the first version of the software module. In some embodiments, identifying exploitative input includes evaluating an input against the symbolic constraints if, during execution of the first version of the software module, the input results in a breakpoint hit. In some embodiments, identifying exploitative input includes, based on the evaluation of the input against the symbolic constraints, determining whether the input results in an exploitation of a vulnerability in software.

These and other embodiments are described further below with reference to the figures.

BRIEF DESCRIPTION OF THE DRAWINGS

Like reference numerals refer to corresponding parts throughout the drawings.

DESCRIPTION OF EMBODIMENTS

Definitions

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As used herein, "VulnDiff" refers to any system, method, or program that utilizes symbolic constraints to represent differences in software. As used herein, "SymFW" refers to any system, method, or program that provides protection for and prevents against known software vulnerability exploitation without having to install software patches. As used herein, "revision" and "software version" are used interchangeably.

Overview

A system and method for identifying and preventing vulnerability exploitation is provided. First, two versions of a software module, a patched and an unpatched version, are compared. The differences between the two versions are represented as symbolic constraints. Next, a firewall client is deployed on a client device running the unpatched version of the software. Breakpoints are set at divergent paths corresponding to known vulnerability points in the unpatched software. If an input results in a breakpoint hit, then the input is evaluated against the symbolic constraints. Last, based on the evaluation of the input against the symbolic constraints, the input is determined to be exploitative or non-exploitative.

Detailed Description

As described above, the interconnectivity of the Internet leads to problems of exploitation of vulnerabilities in software. In some embodiments, patches are utilized to fix the vulnerabilities. However, in other embodiments, installing patches can be very expensive and costly, can disrupt business, and may introduce new problems. For example, if there is a severe vulnerability that is affecting current systems, software developers might release an "out of band" patch which is not subject to extensive testing. "Out of band" patches can be very buggy, due to their lack of rigorous testing, and can lead to devastating consequences, such as loss of data or improper software function. In addition, in most cases, the patching process necessarily involves a human installation, which can only be done on a human scale time frame. One advantage of the techniques and mechanisms provided is the ability to be automatically deployed in the millisecond scale, without the need for a human installation.

A variety of defense mechanisms currently exist for overcoming one or more of the possible attack vectors, such as commercial IDS/IPS and host-based systems (e.g. Anti-Virus, Host Based Security Systems). Yet, many of them are not ideal solutions, due to one or more of the following factors: the performance overhead of the approach outweighs the potential protection, the approach is not compatible with all currently used features (e.g., in legacy programs), the approach is not robust and the offered protection is not complete, or the approach depends on changes in the compiler toolchain or in the source-code while the toolchain is not publicly available. Rather than identifying vulnerabilities, existing commercial solutions identify exploits, or known attacks/exploitations of vulnerabilities, permutations of which hold little to no value for all but opportunistic attackers. Existing solutions therefore only increase cost for opportunistic attackers and are generally ineffective against more determined attackers.

In some embodiments, a system automatically determines differences in a certain patch, turns them into symbolic constraints and constraints are pushed out to customers running a firewall that uses the symbolic constraints. The customers running the firewall are then protected from vulnerability exploitation after receiving the symbolic constraints.

In various embodiments, systems described herein utilize vulnerability signatures. These systems are judged based on soundness (false positive rate) and completeness (false negative rate) metrics. In some embodiments, systems provide perfect precision guarantees for matching exploitative input that exercises known and patched vulnerabilities. Thus, such systems can be sufficiently utilized in place of existing IDS/IPS and host-based systems.

In various embodiments, the mechanisms and techniques described herein focus upon the actual vulnerabilities of software. In some embodiments, if vulnerable versions of software exist, e.g. vulnerable version of a web browser, and if the vulnerability is known, then a patch, or revised version of the software, may also exist. In such embodiments, the vulnerable version of the software is compared with the patch and the differences are then output as symbolic constraints (via a process referred to hereinafter as "VulnDiff"). In some embodiments, the symbolic constraints are then sent to a program or firewall client (referred hereinafter as "SymbolicFW") which uses the symbolic constraints as signatures for detecting exploitative attacks on the vulnerabilities. Thus, in some embodiments, the system and methods presented focus on exploitations of known vulnerabilities, rather than the behavior of known exploits (e.g., viruses/malware).

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Figure 1:
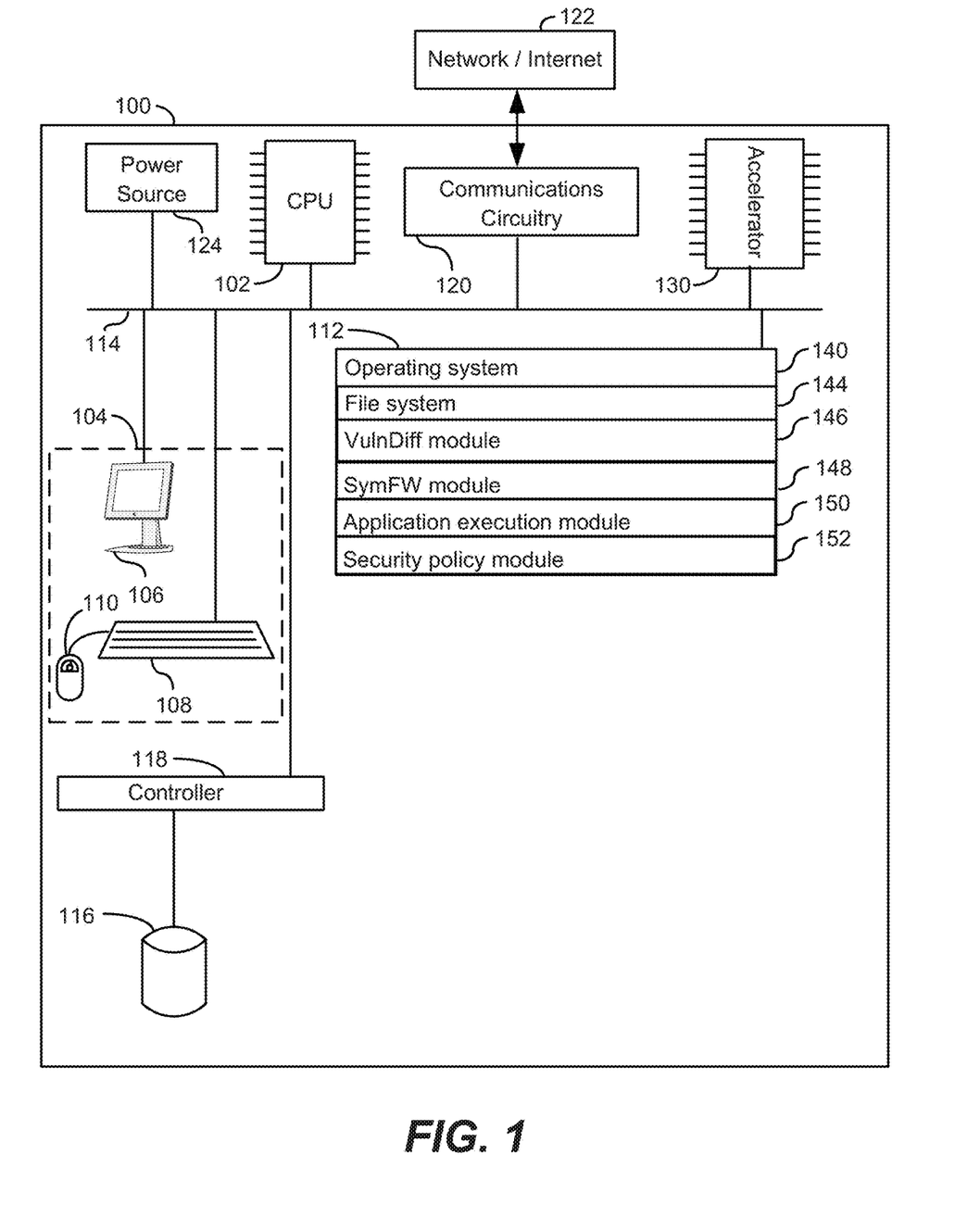
FIG. 1 is a block diagram illustrating an example of a computer system capable of implementing various processes described in the present disclosure.

FIG. 1

FIG. 1 is a block diagram illustrating an example of a computer system capable of implementing various processes described in the present disclosure. The system 100 typically includes a power source 124; one or more processing units (CPU's) 102 for executing modules, programs and/or instructions stored in memory 112 and thereby performing processing operations; one or more network or other communications circuitry or interfaces 120 for communicating with a network 122; controller 118; and one or more communication buses 114 for interconnecting these components. In some embodiments, network 122 can be the another communication bus, the Internet, an Ethernet, an Intranet, other wide area networks, local area networks, and metropolitan area networks. Communication buses 114 optionally include circuitry (sometimes called a chipset) that interconnects and controls communications between system components. System 100 optionally includes a user interface 104 comprising a display device 106, a keyboard 108, and a mouse 110. Memory 112 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 112 may optionally include one or more storage devices 116 remotely located from the CPU(s) 102. Memory 112, or alternately the non-volatile memory device(s) within memory 112, comprises a non-transitory computer readable storage medium. In some embodiments, memory 112, or the computer readable storage medium of memory 112 stores the following programs, modules and data structures, or a subset thereof:

an operating system 140 that includes procedures for handling various basic system services and for performing hardware dependent tasks;

a file system 144 for storing various program files;

a VulnDiff module 146 for comparing two versions of software and for representing the differences as symbolic constraints;

a SymFW module 148 for setting breakpoints at divergent paths corresponding to vulnerability points in software and for evaluating input against the symbolic constraints in order to determine whether the input is attempting to exploit vulnerabilities in the software;

an application execution module 150 for executing software applications; and a security policy module 152 for handling input that has been identified as exploitative by the SymFW module 148.

Any of the modules mentioned above may also include submodules. Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 112 may store a subset of the modules and data structures identified above. Furthermore, memory 112 may store additional modules and data structures not described above.

In some embodiments, FIG. 1 also includes a hardware accelerator 130 for processing VulnDiff or SymFW processes. In such embodiments, CPU or processor 102 does not handle the processes related to the VulnDiff or SymFW modules, but rather a separate hardware processor, e.g. hardware accelerator 130, is specially designed and dedicated to the VulnDiff and SymFW processes such that processor 102 can dedicate resources and time to other processes and tasks. In some embodiments, hardware accelerator 130 is a separate processor from CPU 102, but is located on the same chip.

Although FIG. 1 shows one example of a computer system, FIG. 1 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 1 could be implemented on single servers and single items could be implemented by one or more servers. The actual number of servers used to implement a system and how features are allocated among them will vary from one implementation to another, and may depend in part on the amount of data traffic that the system must handle during peak usage periods as well as during average usage periods.

Figure 2:
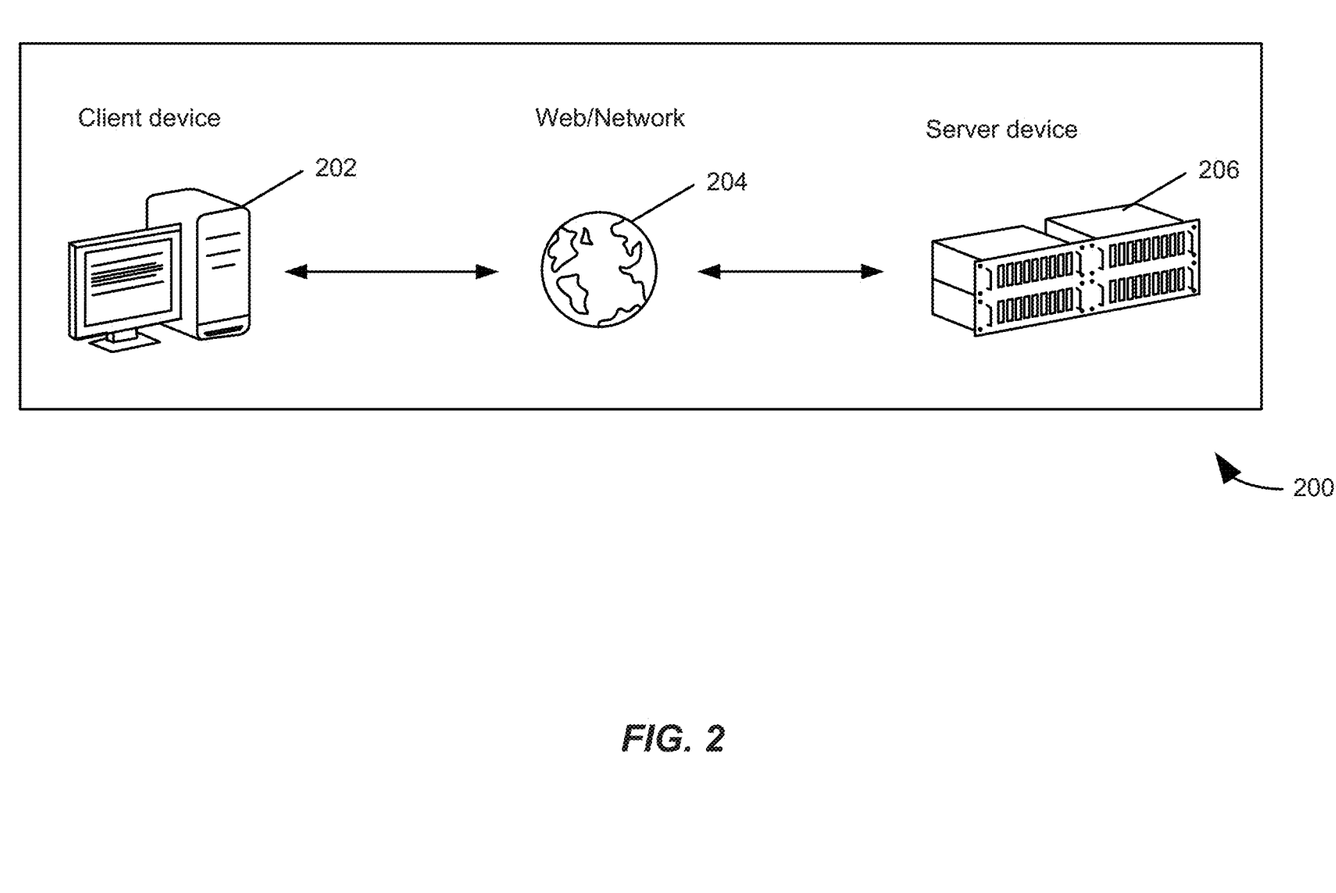
FIG. 2 illustrates a general overview of an example system for implementing various methods of the present disclosure.

FIG. 2

FIG. 2 illustrates a general overview of an example system 200 for implementing various methods of the present disclosure. In particular, FIG. 2 describes a client device 202, e.g. a computer, configured with a web browser to interact with another a server device 206 via Internet or Web 204 containing modules required for performing the mechanisms and techniques described herein. In some embodiments, client device 202 is configured to run a firewall program, e.g. SymFW, that identifies and prevents exploitation of vulnerabilities in unpatched software. In such embodiments, the firewall program utilizes a set of symbolic constraints sent from server device 206. The set of symbolic constraints are output from a program, e.g. VulnDiff, running on server device 206 that compares two versions of software, e.g. a patched version and an unpatched version, and represents those differences as the set of symbolic constraints sent to client device 202.

As with FIG. 1, FIG. 2 is intended more as functional description of the various features which may be present in a set of servers than as a structural schematic of the embodiments described herein. In practice, and as recognized by those of ordinary skill in the art, items shown separately could be combined and some items could be separated. For example, server device 206 could be implemented as a single server or as multiple servers. As another example, client device 202 could be implemented as a single client computer or as multiple client computers. The actual number of client computers and servers used to implement system 200 and how features are allocated among them will vary from one implementation to another, and may depend in part on the amount of data traffic that the system must handle during peak usage periods as well as during average usage periods.

FIGS. 3A-3B, 4, and 5 are flowcharts representing methods 300, 400, and 500, respectively, according to certain embodiments of the present disclosure. Methods 300, 400, and 500 are governed by instructions stored in a computer readable storage medium and that are executed by one or more processors of one or more servers. Each of the operations shown in FIGS. 3A-3B, 4, and 5 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 3A:
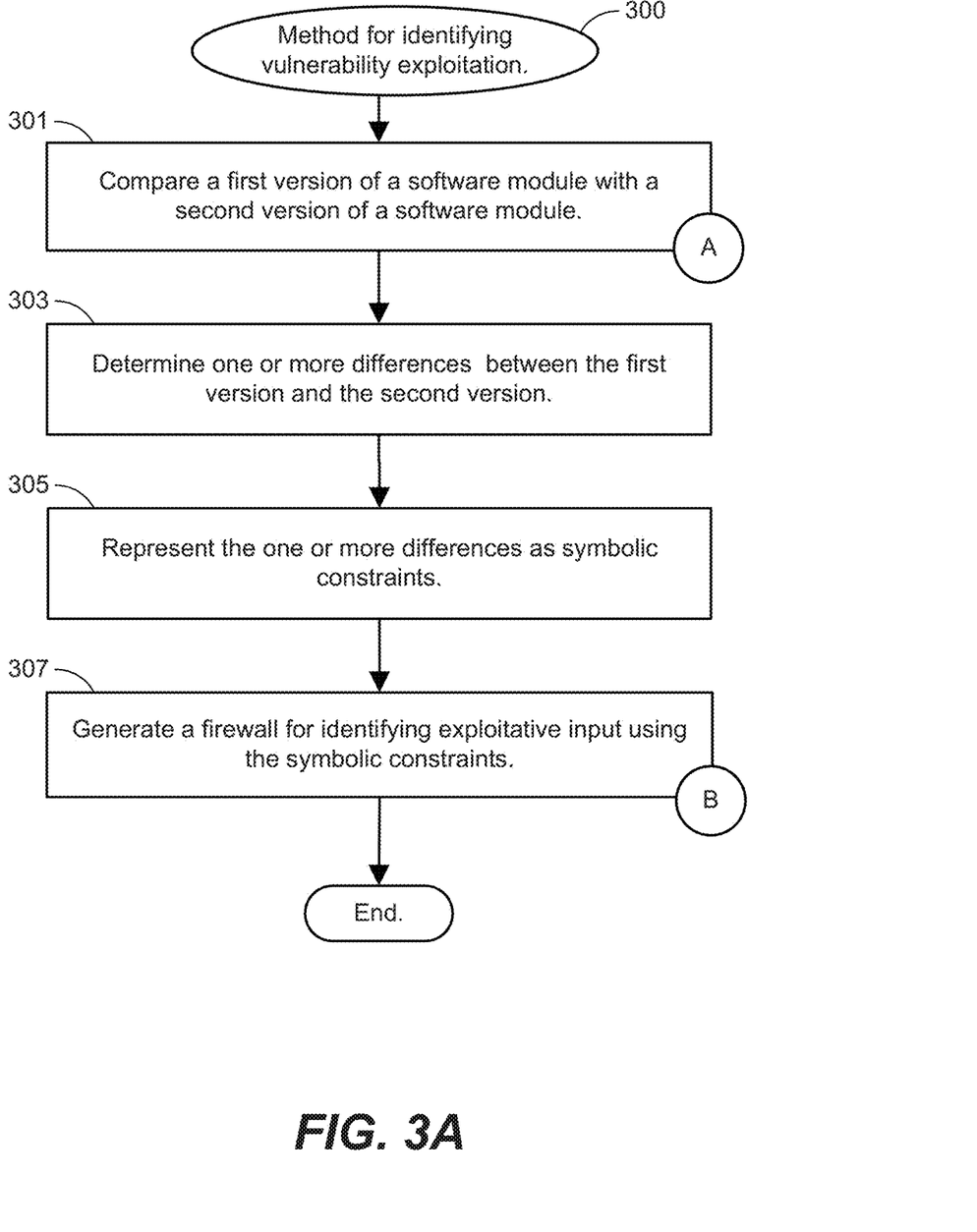
FIGS. 3A and 3B illustrate a method for identifying vulnerability exploitation, according to certain embodiments of the present disclosure.
Figure 3B:
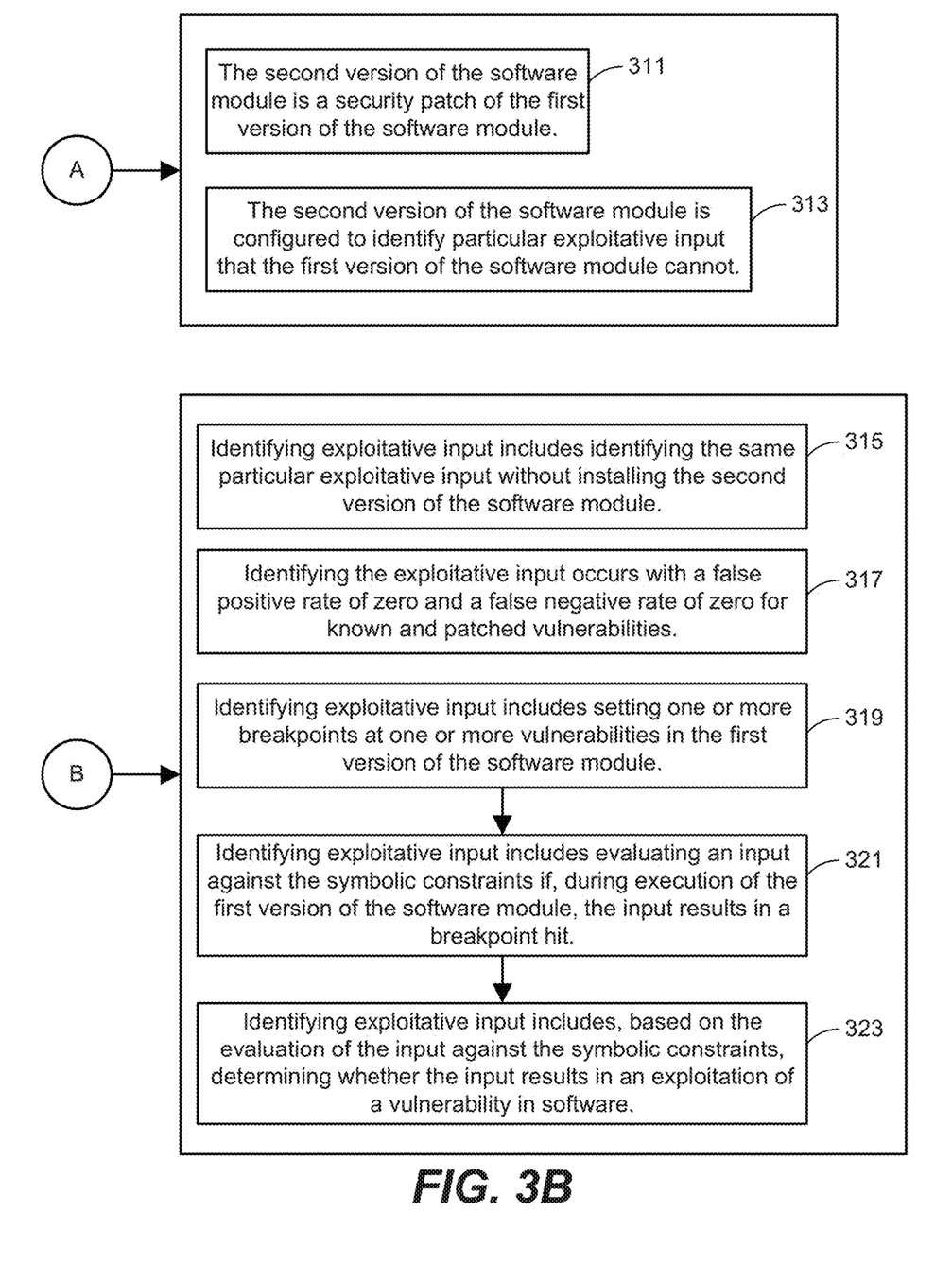

FIGS. 3A-3B

FIGS. 3A and 3B illustrate a method 300 for identifying vulnerability exploitation, according to certain embodiments of the present disclosure. Method 300 begins with comparing (301) a first version of a software module with a second version of a software module. In some embodiments, the first version of a software module is an unpatched version of a program and the second version is (311) a patched version. Next, one or more differences is determined (303) between the first version and the second version. In some embodiments, the differences correspond to known vulnerabilities in the first version of software that the second version of the software attempts to fix. Then, the one or more differences are represented (305) as symbolic constraints. In some embodiments, "symbolic constraints" is a term of art well-known in to one of ordinary skill in the art to refer to requirements placed on incoming program data and conditioned on software input that when satisfied cause a desired execution path through the software. Last, method 300 concludes with generating (307) a firewall for identifying exploitative input using the symbolic constraints. In some embodiments, this firewall is a program to be deployed to client devices for protection against the known vulnerabilities in the first version of the software without the need to install the second version of the software. In some embodiments, generating a firewall is a general term for all a client device to run the first version of software without being exploited by the known vulnerability addressed in the second version. For example, in some embodiments, the symbolic constraint differences between the first and second versions of software are produced as tuples at a server, to be consumed by other processes, e.g. SymFW, running on a client device (see FIG. 4 below).

In some embodiments, the second version of the software module is configured to identify (313) particular exploitative input that the first version of the software module cannot and identifying exploitative input includes identifying (315) the same particular exploitative input without installing the second version of the software module. In some embodiments, identifying exploitative input occurs (317) with a false positive rate of zero and a false negative rate of zero for known and patched vulnerabilities. In some embodiments, identifying exploitative input includes setting (319) one or more breakpoints at one or more vulnerabilities in the first version of the software module. In some embodiments, identifying exploitative input includes evaluating (321) an input against the symbolic constraints if, during execution of the first version of the software module, the input results in a breakpoint hit. In some embodiments, identifying exploitative input includes, based on the evaluation of the input against the symbolic constraints, determining (323) whether the input results in an exploitation of a vulnerability in software.

Detailed Description of an Example VulnDiff Program

The following description provides a detailed explanation of an example implementation of a VulnDiff program, used for generating symbolic constraints from different versions of software.

In some embodiments, VulnDiff provides a method for representing differences between software revisions as symbolic constraints. As previously described, symbolic constraints are requirements placed on incoming program data, conditioned on the software input that when satisfied cause a desired execution path through the software. In other words, symbolic constraints describe the requirements of incoming data in a software program for exercising the differences between software revisions.

In general, differences in software revisions can be represented in many different ways. At the lowest level of comparison (from computer language standpoint) is the bit-wise comparison. Bit-wise comparison compares 0s and 1s and is not practically useful for the purposes presented in the present disclosure. Differences can also be compared using byte-wise comparison of 1s and 0s, which still give you a difference of 0s and 1s but also doesn't give a practically useful representation of the differences. At a slightly higher level, revision differences can be represented using disassembled CPU instructions (e.g. taking 0s and 1s and translating them into assembly language). This representation provides the lowest-level understanding of the differences in software. Symbolic constraints represent software differences at a higher level. Symbolic constraints encapsulate the logical aspects of instructions as they constrain input along chosen execution paths. The following is a generalized example of a method for implementing VulnDiff.

First, two versions of software (vulnerable and patched) are disassembled into CPU instructions. Next, the CPU instructions are processed in a "lifting" phase, which converts CPU instructions into an intermediate language or intermediate representation. In some embodiments, "lifting" is the inverse of "lowering," a process conducted by software compilers. As used herein, the terms "intermediate language" and "intermediate representation" are used interchangeably. Examples of an intermediate language are LLVM IR, VEXIR, BIL, and REIL.

Next, differences in the versions of software are found by comparing the resultant intermediate representations (IR) and identifying divergences in program logic (e.g. $x=1$ vs $x=2$). In some embodiments, this can be accomplished using a standard "diff" function between the two intermediate representations. Once differences are found, the differences/ variances are captured and used to construct symbolic constraints. For example, if a vulnerable revision contained an instruction: If x=1, then do y, and the patched revision contained the corresponding instruction: If x=2, then do y, the symbolic constraint representing the vulnerable condition would be: x=1, assuming Program A is the unpatched/vulnerable version. In some embodiments, symbolic constraints are written in SMT-LIBv2 format.

Figure 4:
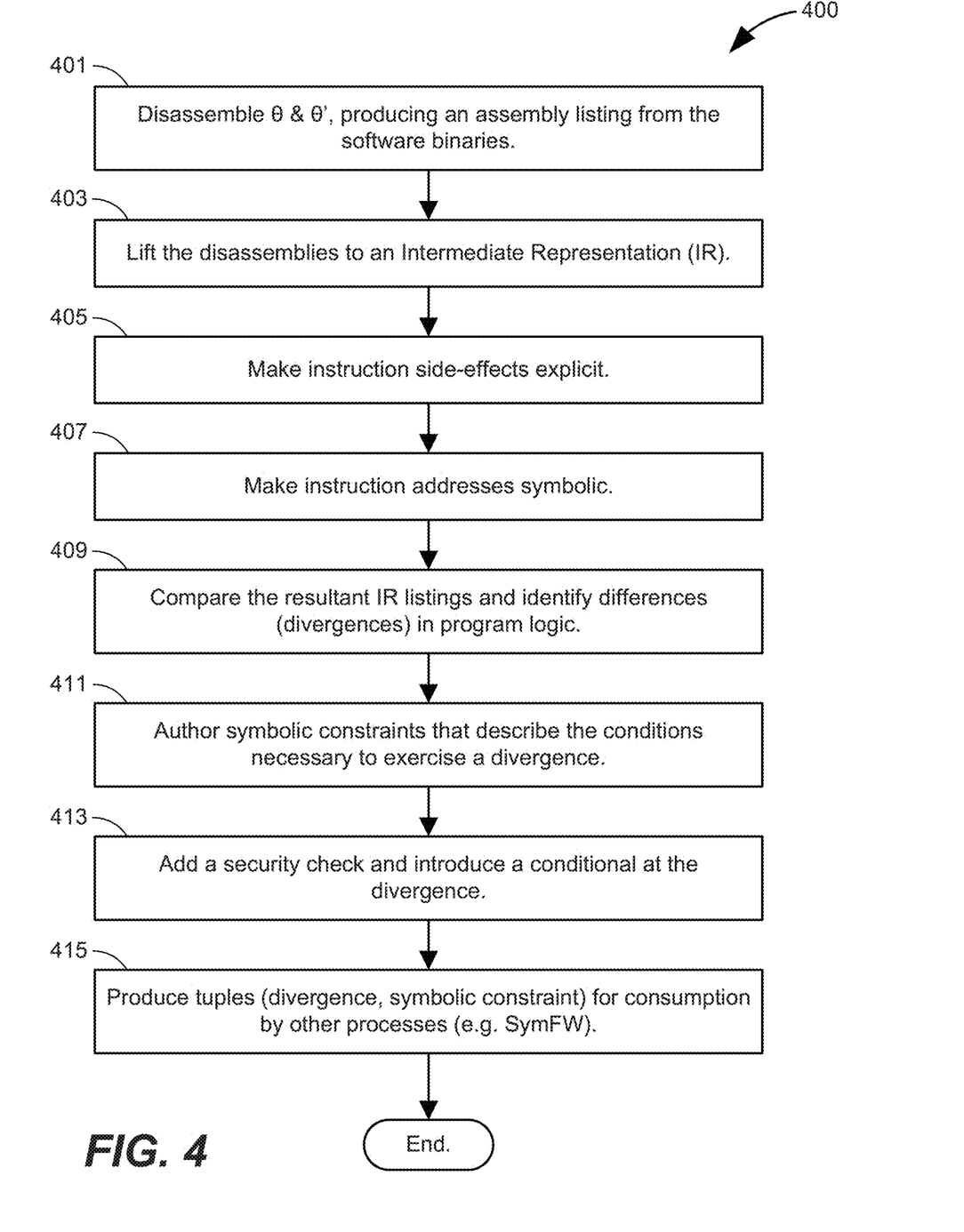
FIG. 4 illustrates one particular implementation of a method for representing vulnerabilities as symbolic constraints, according to certain embodiments of the present disclosure.

FIG. 4

FIG. 4 illustrates one particular implementation of a method 400 for representing vulnerabilities as symbolic constraints, according to certain embodiments of the present disclosure (a specific example of a method for implementing VulnDiff).

Method 400 begins with disassembling (401) Θ & Θ', where Θ=unpatched software revision and Θ'=patched software revision. This results in producing an assembly listing from the software binaries. Next, the dissassemblies are "lifted" (403) to an Intermediate Representation (IR). IR presents a restricted instruction set, easing further analyses because fewer instructions must be supported. In some embodiments, "lifting" refers to converting CPU instructions into a "common tongue" language, which is a different language altogether that cannot directly execute on a computer. Next, instruction side-effects are made (405) explicit, making it easier to reason about them. In other words, the side-effects are no longer considered side-effects, but are actual effects. Subsequently, instruction addresses are made (407) symbolic, easing further analyses to find meaningful differences. The resultant IR listings are then compared (409) and differences in program logic are identified. In some embodiments, these differences are referred to as the divergences. Next, symbolic constraints that describe the conditions necessary to exercise a divergence are authored (411). In some embodiments, this will be an empty set since divergences are unconditional. In other words, in such embodiments, Θ always behaves one way at a certain point in execution and Θ' always behaves a different way. Next, a security check is added (413) and a conditional is introduced at the divergence. In some embodiments, the authored symbolic constraints describe how to exercise this modified code. Last, method 400 concludes with producing (415) tuples (divergence, symbolic constraint) for consumption by other processes (e.g. clients running SymFW). As mentioned above, in some embodiments, step 415 serves as a specialized form of "generating a firewall."

One advantage of using symbolic constraints, is the ability to compare software revisions from software on two different CPU architecture, e.g., an Intel x86 (laptop) vs. an ARM (phone). This means that the symbolic constraints are "agnostic" to CPU architecture. This is because the instructions are represented in a high enough semantic understanding that the differences in CPU architectures are not relevant. One example of a symbolic constraint is represented in the example below:

If the unpatched file, Θ is:

```
#include <stddef.h>
#include <stdio.h>
#include <string.h>
int main (int argc, char * argv[ ]) {
    size_t idx = 0;
    char *input = argv[1];
    printf("input: %s\n", input);
    // first gate: byte0 == byte1 * 2 ?
    if (input[0] == input[1] * 2) {
        // second gate: if byte2 != 1, crash (probably)
```

```
        idx = 0x1000 * input[2];
        printf("input[2] = 0x%02x, idx = %d\n", input[2], idx);
        input[idx] = 42;
        printf("if we're unpatched and byte2 is crazy, we should have crashed\n");
    } else {
        printf("first gate failed\n");
    }
    printf("we didn't crash\n");
    return 42;
}
```

And the patched file, Θ' is:

```
#include <stddef.h>
#include <stdio.h>
#include <string.h>
int main (int argc, char * argv[ ]) {
    size_t idx = 0;
    char *input = argv[1];
    printf("input: %s\n", input);
    // first gate: byte0 == byte1 * 2 ?
    if (input[0] == input[1] * 2) {
        // second gate: if byte2 != 1, crash (probably)
        idx = 0x1000 * input[2];
        printf("input[2] = 0x%02x, idx = %d\n", input[2], idx);
        if (0 == idx) {
            input[idx] = 42;
        }
        printf("if we're unpatched and byte2 is crazy, we should have crashed\n");
    } else {
        printf("first gate failed\n");
    }
    printf("we didn't crash\n");
    return 42;
```

Then the symbolic constraints that describe input that will reach the vulnerable code path can be represented as (Z3 exemplar format):

Symbolic constraint: (<Bool (if (argv1_0_24[23:16]==0) then 0x7ffeffe2 else (if (argv1_0_24[15:8]==0) then 0x7ffeffe3 else (if (argv1_0_24[7:0]==0) then 0x7ffeffe4 else 0x7ffeffe5)))==0x7ffeffe5>, <Bool argv1_0_24[16:16]==0>, <Bool argv1_0_24[23:17]==argv1_0_24[14:8]>, <Bool argv1_0_24[23:23]==argv1_0_24[15:15]>)

The example above is just one of many different examples for implementing a method for representing differences between software as symbolic constraints.

Figure 5:
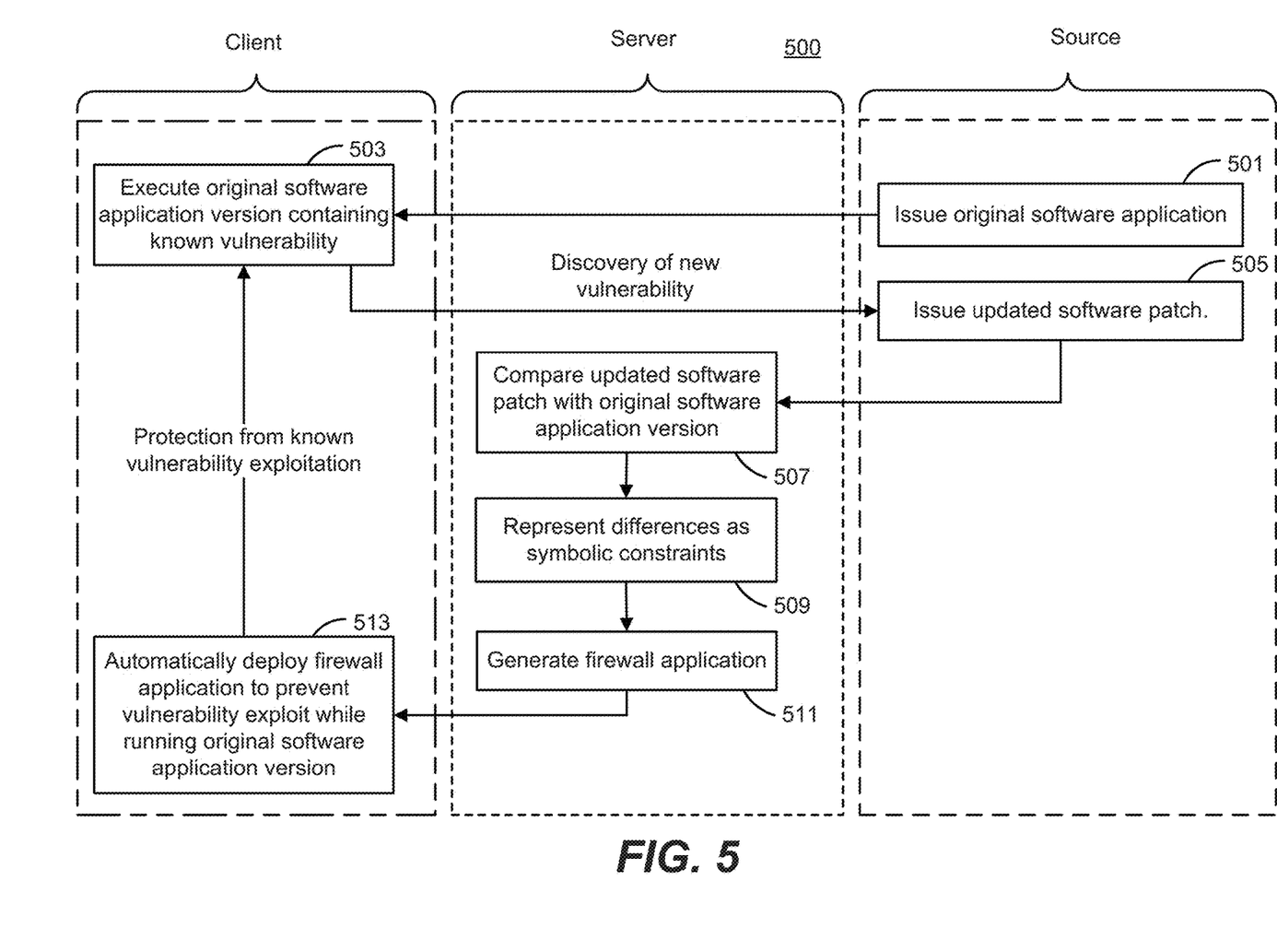
FIG. 5 is a conceptual diagram depicting a flowchart of an example system and method for protecting a client device against vulnerability exploitation, according to certain embodiments of the present disclosure.

FIG. 5

FIG. 5 is a conceptual diagram depicting a flowchart of an example system and method for protecting a client device against vulnerability exploitation, according to certain embodiments of the present disclosure. Method 500 begins with issuing (501) an original, or unpatched, software application from an application source. For example, the application can be Microsoft Internet Explorer. Next, a client device executes (503) the original software application version. If a new vulnerability in the original version is discovered, the source, e.g. Microsoft, issues (505) an updated version, e.g. a software patch. A server, e.g. a server running VulnDiff, then compares (507) the updated software patch with the unpatched software application version. In some embodiments, the differences between the two versions basically represent the fix for the vulnerability. The differences between the patch and the unpatched are then represented (509) as symbolic constraints. Next, a firewall application is generated (511) by the server and deployed (513) on the client device to prevent vulnerability exploit while running the original or unpatched version of the software application. In some embodiments, the firewall application is automatically deployed without the manual installation or human intervention. In some embodiments, the process repeats whenever a new vulnerability is discovered in the unpatched software application. In such embodiments, since the firewall application has already been generated and deployed (and running on the client device), then updates (such as updated symbolic constraint lists/files or firewall user-end application updates) are automatically sent to the client device.

In some embodiments, breakpoints are set on divergent paths that do not correspond to vulnerabilities. In some embodiments, a set of divergent paths are a superset of a set of vulnerabilities. In some embodiments, setting breakpoints on divergent paths is equivalent to setting breakpoints on vulnerabilities.

Detailed Description of SymFW Program

The following description provides a detailed explanation of an example implementation of a SymFW (a.k.a. Symbolic Firewall) program, to be used in conjunction with the VulnDiff program described above, that identifies and prevents exploitative attacks on software vulnerabilities using a set of symbolic constraints, referred to as SymFW signatures. The following is a generalized example of using SymFW already running on a client device.

In the example, the software application is PDF viewer/processor. If a client opens a PDF file from the Internet, an instance of SymFW will intercept or introduce a delay before opening the file. If while opening the PDF, a breakpoint is hit (the breakpoint being set at a known vulnerability in a vulnerable version of the software program opening the PDF), SymFW will evaluate the PDF file itself against a set of symbolic constraints generated by VulnDiff, described above, from the differences between the vulnerable unpatched version and a patched version of the software. Hence, in the example, the PDF file is evaluated against the symbolic constraints. If all the constraints are satisfied, then the file is determined to be an exploitative input. If a file is determined to be exploitative, then SymFW will either inform the user that the input is exploitative and ask the user how to proceed or proceed according to procedures outlined in user-defined or default policy guidelines.

In some embodiments, SymFW consumes (divergence, symbolic constraint) tuples. These tuples can be automatically produced by the VulnDiff method described above or can be manually authored. For at least cost and speed reasons, an automatic process is preferable. In such embodiments, SymFW utilizes these tuples and the software under test (the unpatched version) to detect when incoming data satisfies constraints necessary to exercise divergent code. In some embodiments, input that exercises code that differs between two software versions, a.k.a. "revisions," is treated as suspect. In various embodiments, some subset of the divergences will be security-relevant and some subset of data that hits a divergence is an exploit for the vulnerability that was patched at the divergence.

The following description is a specific example of a method for implementing SymFW.

Definitions

$\Theta$/software under protection: a piece of software that the user wishes to protect.

$\Theta A$ (unchanged): the unpatched revision of software A.

$\Theta A'$ (changed): the patched revision of software A.

T/execution trace: a listing of consecutively-executed instruction addresses. Addresses can be symbolic, referring to IR offsets or absolute, referring to actual software virtual addresses. Each T is associated with a $\Theta$.

Tnull is the empty trace. It contains no addresses.

Tmax is a trace of maximum locality. An execution trace is said to be of maximum locality iff the trace's source (choke point) and sink (divergence) coincide. In other words, the length of such a trace (its chop length, see below) is always 1.

$\Gamma$/choke point: the source instruction of an execution trace.

$\Gamma T$: the choke point of execution trace T.

$\Delta$/divergence: the sink instruction of an execution trace. By definition, the instruction backing the divergence will differ between patched and unpatched software revisions.

$\Delta T$: the divergence of execution trace T.

$\Xi$/chop length: the count of instructions in an execution trace.

$\Xi T$: the chop length of execution trace T.

[ ]/set: square brackets are used to denote a set of items.

[T]: a set of execution traces.

L/vulnerability language: a set of symbolic constraints that define the precise set of expressions of a vulnerability. An exploit is an expression in this set. Each L has a corresponding T.

LA: the vulnerability language for vulnerability A.

e, where e∈LA: e is an exploit for vulnerability A.

[L]A: the set of vulnerability languages in $\Theta A$ (one language per patched vulnerability).

Process: A process is said to be online if its logic must be performed in a streaming fashion on arriving software input and offline otherwise (can be performed on isolated systems, asynchronously to online and other offline processes).

NOTE: For the purposes of the example, all processes are conducted on a per-software, per-revision basis. For example, a user wishes to protect software A ($\Theta A$), for which there is a patchset resulting in Software A' ($\Theta'$).

Informal Overview

1) PreProcess: conducts one-time setup tasks for each $\Theta$.
2) AuthorshipProcess: authors vulnerability languages ([L]). These are sets of symbolic constraints.
3) MatchProcess: matches untrusted data against [L]. Takes action based on user-configured policy.
4) OptimizeProcess: reduces overhead of MatchProcess by iterative scoping locality. In other words, it fuzzes chop length ($\Xi$) until optimal overhead is observed in MatchProcess.

Formal Description of Method

PreProcess (offline; one-time per $\Theta$; consumes $\Theta$ & $\Theta'$; produces [T])

1) Install SymFW inline between the untrusted input source (e.g. a network or file read( ) socket) and $\Theta$ (the software under protection).
2) User configures policy. Policy dictates what action to take on successful match. Policy is granular per-$\Theta$.
3) Disassemble $\Theta'$ (patched) and $\Theta$ (unpatched) software revisions.
4) Raise disassembly to an intermediate representation (IR).
5) Statically diff IRs, identifying [$\Delta$] (the set of divergences).
6) Let [$\Gamma$]=[$\Delta$] (the set of choke points equal the set of divergences).
    a. This implies that [$\Xi$]=0. (the set of chop lengths are all 0).

7) Provided [Γ] & [Δ], produce [T] (the set of execution traces).

AuthorshipProcess (offline; consumes [T]; produces [L])

8) Let [L] be the empty set.
9) For each T∈[T]:
   a. Let L be empty.
   b. Control Flow Graph (CFG) edge traversal in T:
     i. Generate a (set of) symbolic constraint(s) that fully encapsulate(s) the input's impact on whether this edge would be traversed.
     ii. Append symbolic constraint to L.
   c. Append L to [L].
10) Produce [L].

MatchProcess (online; consumes [T] & [L]; performs actions; produces metrics)

11) For each T∈[T]:
   a. Set a breakpoint on F in corresponding Θ.
   b. Execute Θ.
   c. Upon breakpoint:
     i. Start a timer.
     ii. Fork the process and the timer:
       1. Process, Timer A:
         a. Check incoming data for satisfiability of corresponding L.
         b. If sat, perform action based on policy.
         c. If unsat, stop timer and continue normal execution.
       2. Process, Timer B:
         a. Stop timer and continue normal execution.
     iii. Measure time delta between Timer A and Timer B to determine execution time overhead, record overhead in overhead metrics.
     iv. Produce overhead metrics.

OptimizeProcess (offline; consumes overhead metrics, corresponding Θ, [T] & [L]; produces [T]', [L]')
optimize choke points, reducing overhead of vulnerability signatures 12) For each L E [L]:
   a. Maintain overhead metrics: chop length (Ξ) relationship.
   b. Scale T, L's Ξ in response to reported metrics, optimizing anticipated MatchProcess overhead. This scaling will either add or remove instructions from the corresponding T and may either add or remove constraints from the corresponding L. As necessary, request additional symbolic constraints from AuthorshipProcess.
     i. In the trivial case, increasing Ξ by 1 will add 1 instruction to T and may or may not cause modification to L (contingent on whether this new instruction is conditional and is thus deserving of a representative constraint). This additional instruction falls within the same basic block as the previous choke point (Γ) and becomes the new choke point (Γ).
     ii. In the nontrivial case, the previous choke point (Γ) resides at the beginning of a basic block. Any increase to Ξ will cause a fork in the T in the direction opposite execution.
   c. Produce [T]', [L]' for MatchProcess consumption.

Figure 6:
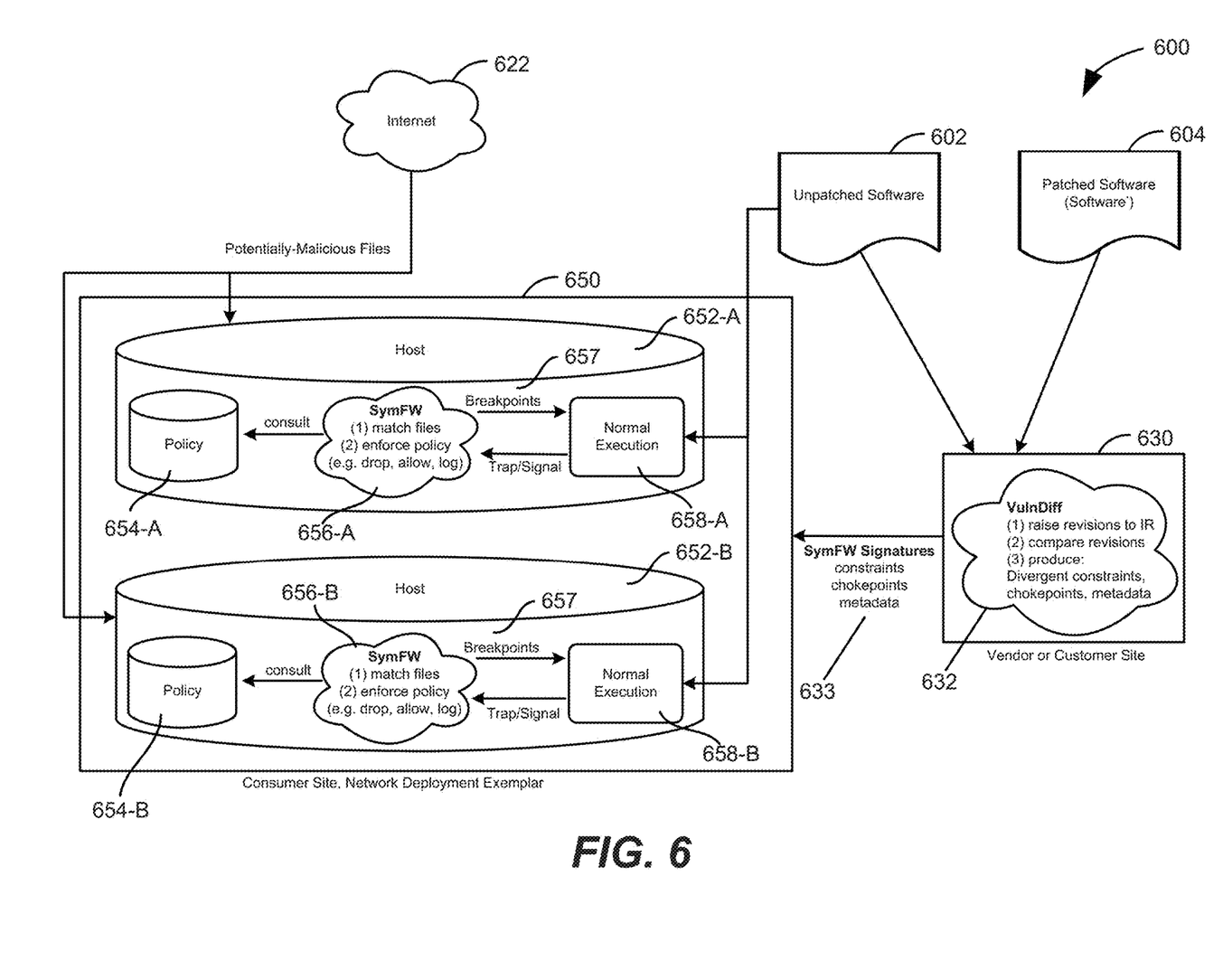
FIG. 6 depicts an example system detailing a host-based firewall system, in accordance with certain embodiments of the present disclosure.

FIG. 6

FIG. 6 depicts an example system detailing a host-based firewall system, in accordance with certain embodiments of the present disclosure. In various embodiments, a vulnerability is identified in Software. The Software Vendor issues a new Software revision/patch 604 that addresses the vulnerability. The patched and unpatched 602 Software revisions are fed into a program called VulnDiff 632 running on the vendor or customer site 630. As described above, VulnDiff accomplishes several objectives: (1) raises revisions (or differences in the issued revision) to intermediate representation (IR), (2) compares the revisions, (3) produces: divergent constraints, chokepoints & metadata. These three objectives together result in a set of symbolic constraints labeled SymFW signatures 633. Once the SymFW signatures 633 are output by VulnDiff 632, they are pushed to SymFW instances 656-A and 656-B, or clients running a firewall program called SymFW.

For the host-based firewall systems, SymFW is first installed on protected hosts 652-A and 652-B (workstations, laptops, desktops, servers), thus creating SymFW instances 656-A and 656-B, and runs alongside normal functions 658-A and 658-B. The SymFW instances 656-A and 656-B on protected hosts 652-A and 652-B ingest SymFW signatures output by VulnDiff 632. For each protected process described in a SymFW signature 633, SymFW installs breakpoints 657 on execution chokepoints described in the signature. These breakpoints 657 are applied to any running or future instance of the protected program, until the corresponding SymFW signature 633 is retired. The user of the protected host 652-A or 652-B requests resources (e.g. files) from an untrusted source 622 (e.g. the Internet). The protected program executes normally (658-A and 658-B), processing the requested resources, until a breakpoint 657 is hit, at which time SymFW evaluates program state (specifically, input data), against the symbolic constraints in the SymFW signature 633. On a match (the program state satisfies the constraints), SymFW consults the Policy store (654-A and 654-B) to determine and execute the appropriate action (e.g. drop, allow, log).

Figure 7:
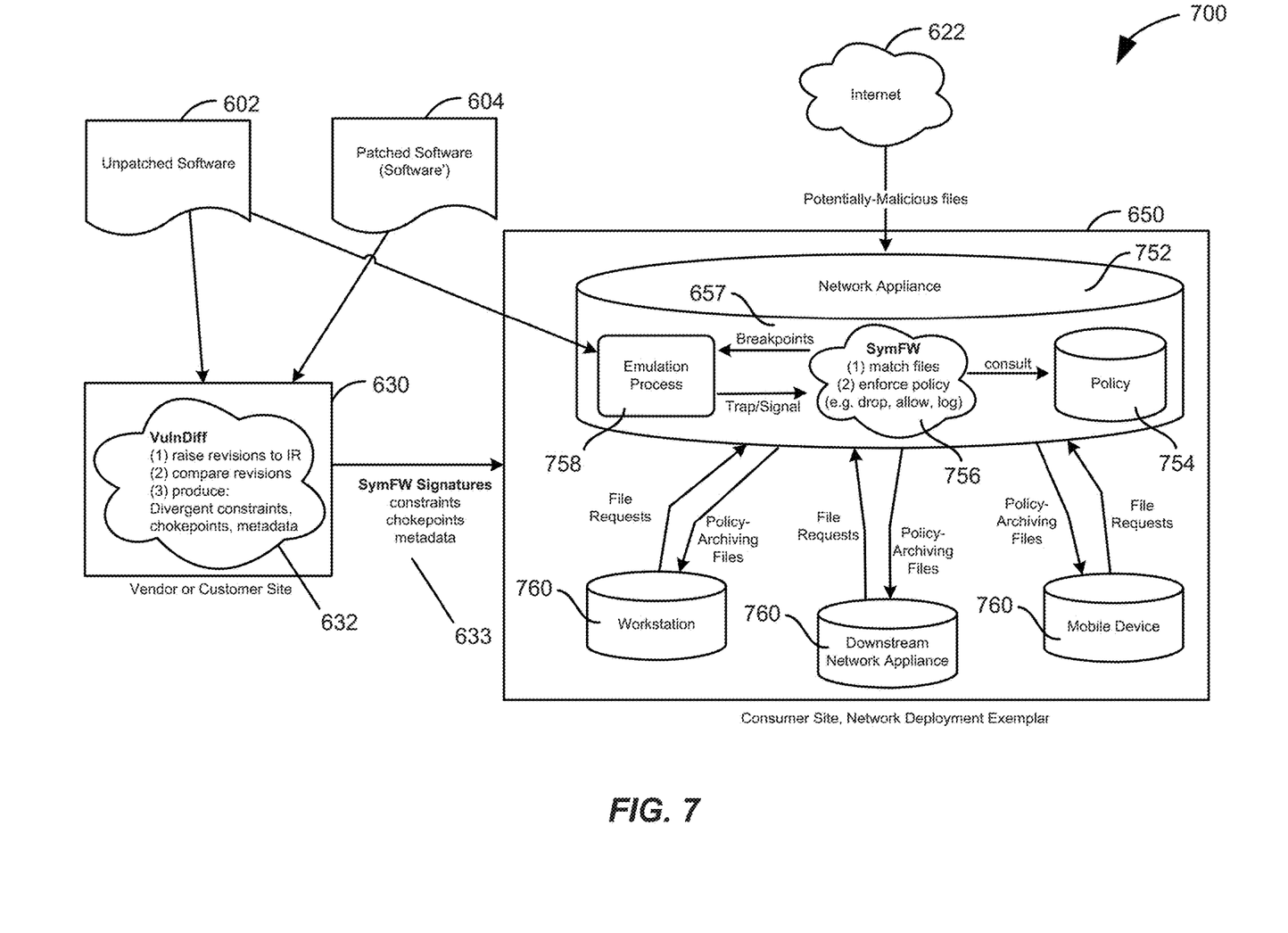
FIG. 7 depicts an example system detailing a network-based firewall system, in accordance with certain embodiments of the present disclosure.

FIG. 7

FIG. 7 depicts an example system detailing a network-based firewall system, in accordance with certain embodiments of the present disclosure. As with the example host-based firewall system depicted in FIG. 6, a vulnerability is identified in Software, the Software Vendor issues a new Software revision/patch that addresses the vulnerability, and the patched and unpatched Software revisions are fed into VulnDiff running on the vendor or customer site.

For the network-based firewall systems, SymFW 756 is installed on intranet proxies 752 designed to sanitize and validate incoming and outgoing resources. Downstream devices/hosts 760 (workstations, laptops, desktops, mobile devices, etc) can only communicate with untrusted networks 622 (e.g. the Internet) through such proxies 752. SymFW instances 756, on protected network appliances 752 (e.g. SymFW-enabled proxies) ingest SymFW signatures 633. The user of a downstream device 760 requests resources (e.g. files) from an untrusted source 622 (e.g. the Internet) via the SymFW-enabled network proxy 752. SymFW launches an emulated copy of the Software that is responsible for handling the incoming resource on the downstream device 760 and sets breakpoints 657 on execution chokepoints described in active SymFW signatures 633. If either the breakpoints 657 are not encountered in a configurable amount of time, or a breakpoint 657 is encountered, SymFW consults policy 754 and takes the appropriate action (e.g. drop the resource, forward the resource to the downstream device, log the event, etc).

FIGS. 6 and 7 provide just two possible example implementations of systems running SymFW in conjunction with VulnDiff. Many other implementations are possible in accordance with embodiments of the present disclosure, as long as the implementations represent software differences as symbolic constraints and then use these symbolic constraints to prevent vulnerability exploitation.

Optimization

In some embodiments, as a matter of optimization, these techniques and mechanisms described may be implemented as hybrid static and dynamic processes. For example, reminiscent of Bloom filter designs, lightweight static measurements would be conducted against incoming data to determine malintent. Should the results prove inconclusive, a handoff to dynamic measurement occurs. In such embodiments, this hybrid approach yields minimal processing overhead for majority traffic and modest processing overhead for outlier traffic. In some embodiments, one important insight that informs this design is the observation that vulnerabilities are frequently discovered in seldom-exercised code. In such embodiments, exploitative input must therefore cause execution of code paths rarely seen under normal circumstances.

Advantages

There are several advantages to using SymFW or a similar system for preventing exploitation of software vulnerabilities. One advantage is precision. SymFW offers a solution that is both utterly sound (no false positives) and utterly complete (no false negatives). Another advantage is efficiency in performance. Instances of SymFW are capable of performing with acceptable overhead for real-world deployment, both as a network device and on-host. Another advantage is the ability for SymFW to be deployed and respond to new threats and attacks at machine speeds without incurrent human talent cost. Yet another advantage is the ability for SymFW to signature against any vulnerability in any software that can be run under suitable observation (debugged).

There are several advantages to deploying vulnerability signatures in general as a stopgap instead of actual patches. One advantage of the techniques and mechanism disclosed herein is that disruption is avoided. Patching a service or software almost universally involves restarting said service or software, possibly affecting availability. Deployment of a vulnerability signature confers no such cost. Another advantage is avoidance of unreliability. Patches for critical vulnerabilities are often released as quickly as possible, prioritizing security over thorough testing (for good reason). Nevertheless, inadequately tested patches are more liable to cause regressions. Deployment of a vulnerability signature confers no such cost. Another advantage is reversibility. Once applied, patches typically cannot be rolled back short of redeployment of pre-patched software from backup. In contrast, vulnerability signatures are trivially reversible, should they prove problematic. Another advantage is that the techniques and mechanisms disclosed herein can be fully automated and do not demand human awareness. In fully automated configurations, new vulnerability signatures can be deployed on customer sites without human interaction, unlike classic intrusion defense/intrusion protection services (IDS/IPS). Without the need for human interactions, responses to new vulnerabilities are deployed and handled at machine speed.

In some embodiments, SymFW presents a performant, compatible, and automatic method and system for conducting precise matching of exploitative input among untrusted input. The method matches input that exercises known (and patched) vulnerabilities, providing precision guarantees not found in currently in the computer attack alerting (Intrusion Detection System) and prevention (Intrusion Prevention System) spaces. As previously mentioned, existing IDS/IPS solutions suffer from design shortcomings that retard performance and precision properties, resulting in only best-effort responses to the following open problem: Provided a virtually unlimited set of imprecise indicators of malintent, conduct software input matching in the most sound (fewest false positives) and most complete (fewest false negatives) manner—while remaining realistically performant. In contrast, the techniques and mechanisms described herein scope (without loss of fidelity) the range of malintent to symbolic constraints evaluated at execution choke points. Should untrusted input traverse a divergent path, Symbolic Firewall precisely detects such traversal and takes action (drop, kill, log, etc) based on user-configured policy.

Specialized Hardware

In various embodiments, an optimization includes specialized hardware, such as hardware accelerator 130, in the system that can be utilized for executing ordered, multi-instruction breakpoints. In such embodiments, the specialized hardware provide the system with the ability to tell the CPU set a breakpoint if the CPU executes instructions X, Y, and Z in succession. In such embodiments, the specialized hardware would reduce the amount of symbolic constraints needed (reducing space and execution time overhead) because constraints could be replaced by a requirement to execute configured virtual address instructions in configured order. An interrupt would be raised if and only if the correct order was executed, meaning the data has satisfied the symbolic constraints that would have otherwise needed checking at the beginning of this instruction trace.

In various embodiments, this concept can be implemented, in whole or in part, in a variety of ways, including, but not limited to: (1) having dedicated registers (hardware breakpoints), (2) having dedicated instructions (software breakpoints), or (3) leveraging existing instructions on commodity x86(_64) CPUs for unintended purposes.

In some embodiments, specialized hardware includes "hacking" existing hardware. Existing hardware is insufficient to support the order property necessary for effective acceleration of the techniques and mechanisms provided. However, multiple-instruction breakpoints can be implemented, e.g. by hacking the side-effects of x86 Performance Monitoring Counters (PCMs) or similar.

In some embodiments, specialized hardware includes introducing new instruction(s). In such embodiments, a microcode update would probably be sufficient to add requisite instruction(s). Reserved bits in an existing register could be used to store order state. Support can be implemented in as little as a single additional instruction (with a special argument) and consumption of handful of bits in an existing hardware register.

For example:

1) A new instruction, MBKPT <unsigned char> is introduced. This instruction is inserted into software immediately adjacent to each step in the multi-breakpoint chain (e.g. adjacent to X, Y, Z instructions, where these instructions form the desired chain).
2) Interrupt is generated when MBPKT 0 is executed and order_bit is set.
3) CPU reserves bitsize(unsigned char)+order_bit=9 bits of register space to maintain state.
4) MBPKT "counts down" to 0 from as high as 254. Current "count" is stored in CPU register as current_count.
5) The order bit is set upon MBKPT reset: MBPKT 255. 255 is a reserved argument.
6) The order bit is cleared whenever MBKPT X is executed where X!=current_count−1.

In some embodiments, specialized hardware includes hardware breakpoints. Hardware breakpoints are most costly in terms of register space usage and CPU design, which would likely limit the feature to a small number of instructions. In one example implementation, the system includes a dedicated register per instruction in the multi-instruction breakpoint. Programs write the virtual addresses of the instructions into these hardware registers. During execution, the CPU keeps track of which addresses have been executed and if they're being executed in order. If all configured addresses are executed in order, an interrupt is raised.

Conclusion

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A system for identifying vulnerability exploitation, comprising:
   one or more processors;
   memory; and
   one or more programs stored in the memory, the one or more programs comprising instructions to:
   compare a first version of a software module with a second version of a software module;
   determine one or more differences between the first version and the second version;
   represent the one or more differences as symbolic constraints, wherein the symbolic constraints are constructed from software differences at a higher level than CPU instructions; and
   generate a firewall for identifying exploitative input using the symbolic constraints.

2. The system of claim 1, wherein the second version of the software module is a security patch of the first version of the software module.

3. The system of claim 1, wherein the second version of the software module is configured to identify particular exploitative input that the first version of the software module cannot and identifying exploitative input includes identifying the same particular exploitative input without installing the second version of the software module.

4. The system of claim 1, wherein identifying exploitative input occurs with a false positive rate of zero and a false negative rate of zero for known and patched vulnerabilities.

5. The system of claim 1, wherein identifying exploitative input includes setting one or more breakpoints at one or more vulnerabilities in the first version of the software module.

6. The system of claim 5, wherein identifying exploitative input includes evaluating an input against the symbolic constraints if, during execution of the first version of the software module, the input results in a breakpoint hit.

7. The system of claim 6, wherein identifying exploitative input includes, based on the evaluation of the input against the symbolic constraints, determining whether the input results in an exploitation of a vulnerability in software.

8. A method for identifying vulnerability exploitation, comprising:
   comparing a first version of a software module with a second version of a software module;
   determining one or more differences between the first version and the second version;
   representing the one or more differences as symbolic constraints, wherein the symbolic constraints are constructed from software differences at a higher level than CPU instructions; and
   generating a firewall for identifying exploitative input using the symbolic constraints.

9. The method of claim 8, wherein the second version of the software module is a security patch of the first version of the software module.

10. The method of claim 8, wherein the second version of the software module is configured to identify particular exploitative input that the first version of the software module cannot and identifying exploitative input includes identifying the same particular exploitative input without installing the second version of the software module.

11. The method of claim 8, wherein identifying exploitative input occurs with a false positive rate of zero and a false negative rate of zero for known and patched vulnerabilities.

12. The method of claim 8, wherein identifying exploitative input includes setting one or more breakpoints at one or more vulnerabilities in the first version of the software module.

13. The method of claim 12, wherein identifying exploitative input includes evaluating an input against the symbolic constraints if, during execution of the first version of the software module, the input results in a breakpoint hit.

14. The method of claim 13, wherein identifying exploitative input includes, based on the evaluation of the input against the symbolic constraints, determining whether the input results in an exploitation of a vulnerability in software.

15. A non-transitory computer readable storage medium storing one or more programs configured for execution by a computer, the one or more programs comprising instructions to:
   compare a first version of a software module with a second version of a software module;
   determine one or more differences between the first version and the second version;
   represent the one or more differences as symbolic constraints, wherein the symbolic constraints are constructed from software differences at a higher level than CPU instructions; and
   generate a firewall for identifying exploitative input using the symbolic constraints.

16. The non-transitory computer readable medium of claim 15, wherein the second version of the software module is configured to identify particular exploitative input that the first version of the software module cannot and identifying exploitative input includes identifying the same particular exploitative input without installing the second version of the software module.

17. The non-transitory computer readable medium of claim 15, wherein identifying exploitative input occurs with a false positive rate of zero and a false negative rate of zero for known and patched vulnerabilities.

18. The non-transitory computer readable medium of claim 15, wherein identifying exploitative input includes setting one or more breakpoints at one or more vulnerabilities in the first version of the software module.

19. The non-transitory computer readable medium of claim 18, wherein identifying exploitative input includes evaluating an input against the symbolic constraints if, during execution of the first version of the software module, the input results in a breakpoint hit.

20. The non-transitory computer readable medium of claim 19, wherein identifying exploitative input includes, based on the evaluation of the input against the symbolic constraints, determining whether the input results in an exploitation of a vulnerability in software.

\* \* \* \* \*